J. R. SMITH.
MACHINE FOR CRUSHING AND WASHING SAND.
No. 7,245. Reissued Aug. 1, 1876.
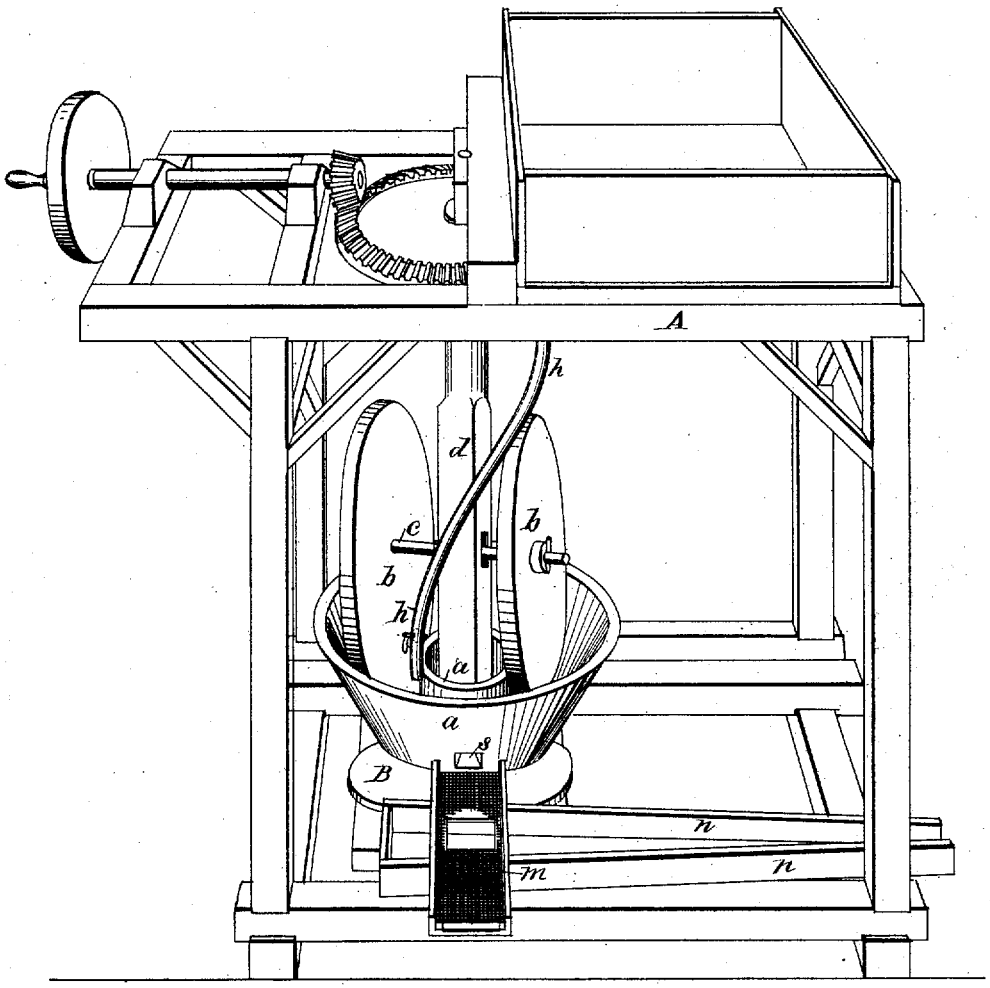
Witnesses;
Grenville Lewis
[illegible]
Inventor
John R. Smith.
By Hill Tillinghast
His attys
N. PETERS, PHOTO-LITHOGRAPHER, WASHINGTON, D. C.

UNITED STATES PATENT OFFICE.

JOHN R. SMITH, OF CONNELLSVILLE, PENNSYLVANIA, ASSIGNOR TO HIMSELF, WILLIAM H. DENNISTON, AND CHRISTIAN SNYDER.

IMPROVEMENT IN MACHINES FOR CRUSHING AND WASHING SAND.

Specification forming part of Letters Patent No. 68,248, dated August 27, 1867; reissue No. 7,245, dated August 1, 1876; application filed February 9, 1876.

*To all whom it may concern:*

Be it known that I, JOHN R. SMITH, of Connellsville, in the county of Fayette and State of Pennsylvania, have invented a new and useful Improved Machine for Crushing and Washing Sand; and I do hereby declare the following to be a full, clear, and exact description thereof, reference being had to the accompanying drawing, making a part of this specification, (which drawing is a perspective view of my improved apparatus for crushing and washing sand,) and to the letters of reference marked thereon.

The object of my invention is to provide for the public an improved apparatus to be used in connection with a current of water for the more effectual disintegration of the rock and separation of the sand from the vegetable or earthy matter, the purpose being not to pulverize the rock, but to reduce it to a sharp sand, suitable for glass-manufacture, and to discharge it from the apparatus continuously as fast as it becomes reduced to the proper degree of fineness.

To this end the invention consists in the apparatus constructed and operating substantially as I will now proceed to describe.

In the drawings, B is a suitable bed or foundation, supporting a fixed circular crushing-pan, *a*, a riddle, *m*, and a trough or spout, *n*. *d* is a vertical slotted shaft, stepped in the center of the pan, and rotated by any desirable means known and employed for similar purposes. *b b* are the heavy crushing wheels or rollers, arranged on the end of a horizontal shaft or axle, *c*, which is loosely connected to the shaft *d*, so that it will travel around therewith, but at the same time allow the rollers to ride easily over and adjust themselves to the materials contained in the pan. *s* is a discharge-gate formed in the lower part of the side of the pan, so as to permit the continuous exit of the heavy sand therefrom as fast as it becomes properly comminuted. *h* is a pipe or conduit, which discharges a stream of water into the pan at one side of the gate *s*, and in the general direction of the movement of the crushing-rollers *b b*, or at least not in the opposite direction. The water may, if preferred, be fed by one or more pipes from an elevated tank, supported by frame-work A, and an interior ring or guard, *a'*, may be provided around the step of the shaft *d*, to prevent the access of sand and water thereto.

The pan should be made flaring, as shown, to provide room for the action of the crushers *b*, and still keep the sandstone which is being crushed as perfectly as possible in the track of the crushers.

The operation of this apparatus is as follows, viz: The sand or rock, crushed to pieces of suitable size, is fed into the pan, so that the rollers will strike it soon after they pass by the gate *s* as they travel around. The water is also discharged from the conduit *h* into the pan at or near the same point. The direction of the steam and the movement of the rollers cause the water to flow around the pan, washing the disintegrated rock or sand and the pulverized dirt along with it, and discharging them freely at the gate, while the larger pieces of uncrushed stone are either passed over by the rollers or swept along past the gate. Should any large pieces of stone escape through the gate, they pass over the tail of the riddle, while the sand drops through into the trough or spout beneath.

If the rollers are of the proper weight, their movement once around the pan will sufficiently disintegrate the rock, and it should be at once free to discharge at the side gate, because if further subjected to the action of the rollers it will be pulverized and rendered useless. The gate should, therefore, be practically at the lower edge of the side wall, as otherwise the sand will be continually reground until destroyed; and, besides, it cannot be removed from the pan without stopping the mill.

It is this feature which principally distinguishes the apparatus from the class of combined crushing and amalgamating machines in which the materials are designed to be reduced to a fine powder, and the quicksilver and gold retained in the pan during the operation of the wheels, and removed after the wheels are stopped, such machine not being practically capable of use for my purposes, nor my machine practically capable of use for amalgamating.

I claim as my invention—

The pan *a*, having a normally-open discharge, *s*, at the lower edge of the side wall, in combination with the shaft *c* and rollers *b b*, and the means for admitting a stream of water into the pan, to flow around with the rollers, and escape continuously at the open outlet, carrying the ground sand with it, substantially as and for the purposes set forth.

J. R. SMITH.

Witnesses:
M. CHURCH,
F. MCKENNY.